United States Patent [19]

Jimenez

[11] 4,189,504
[45] Feb. 19, 1980

[54] METHOD OF COOKING FOODS

[75] Inventor: James A. Jimenez, Temple City, Calif.

[73] Assignee: Electra Food Machinery, Inc., El Monte, Calif.

[21] Appl. No.: 2,896

[22] Filed: Jan. 12, 1979

Related U.S. Application Data

[60] Continuation of Ser. No. 846,183, Oct. 27, 1977, abandoned, which is a division of Ser. No. 619,837, Oct. 6, 1975, abandoned.

[51] Int. Cl.² ............................ A23L 1/01; A23L 1/20
[52] U.S. Cl. .................................... 426/508; 99/328; 99/330; 99/536; 426/509; 426/510; 426/511; 426/523
[58] Field of Search ............... 426/618, 627, 508, 509, 426/510, 511, 520, 521, 523, 474; 99/325, 326, 330, 331, 348, 355, 403, 516, 536, 483, 328

[56] References Cited

U.S. PATENT DOCUMENTS

| | | | |
|---|---|---|---|
| 1,374,341 | 4/1921 | Vaudreuil | 426/510 |
| 2,801,087 | 7/1957 | Hawk | 99/483 X |
| 2,827,379 | 3/1958 | Phelan | 99/330 X |
| 3,232,767 | 2/1966 | Payne | 426/523 |
| 3,332,338 | 7/1967 | Wein | 99/330 |
| 3,353,476 | 11/1967 | Goodman et al. | 99/328 X |
| 3,744,474 | 7/1973 | Shaw | 99/330 X |
| 3,818,819 | 6/1974 | Shulz et al. | 99/330 |
| 3,934,497 | 1/1976 | Hannah | 426/523 X |

FOREIGN PATENT DOCUMENTS 769456  3/1957  United Kingdom ................. 426/509

Primary Examiner—Arthur L. Corbin
Attorney, Agent, or Firm—James E. Brunton

[57] ABSTRACT

A method and apparatus for cooking corn is disclosed whereby corn particles are immersed in water in a cooking vessel to form a mass of corn particles, and the water is circulated throughout said mass. The temperature of the mass is raised and the corn particles agitated by directing steam, from a steam chamber, into said mass by deflecting said steam radially outwardly through perforated side walls in the steam chamber. The steam flow is then stopped whereafter the water circulation is stopped and cooked particles of corn are obtained.

3 Claims, 3 Drawing Figures

METHOD OF COOKING FOODS

BACKGROUND OF THE INVENTION

This is a continuation of application Ser. No. 846,183 filed Oct. 27, 1977, now abandoned, which is a division of Ser. No. 619,837, filed Oct. 6, 1975, now abandoned.

FIELD OF THE INVENTION

The present invention relates generally to a method for cooking a food product and more particularly, to a method for cooking corn in kernel form in large quantities on a commercial basis.

DISCUSSION OF THE PRIOR ART

Various types of apparatus have been suggested for the commercial cooking of food products such as corn and the like. Typically, these apparatus include large cooking vessels for containing the food product and the water in which it is immersed, mechanical agitators for stirring or agitating the product during cooking, and external heating means for heating the water to an elevated temperature. Frequently the cooking vessels comprise elongated tanks open at their tops and semicircular in cross section. These vessels are often mounted on rollers so that they can be positioned over gas burners or the like for heating the water. After the cooking operation, the vessels are moved to a transfer area where the cooked food product is transferred to other vessels containing water. Within these vessels the product is allowed to steep for several hours. The cooked product is then separated from the water for further processing.

A particular problem inherent in the design of commercial cooking apparatus is ensuring the uniformity of cooking of the discrete particles of the food particles which make up the mass being cooked. Localized "hot spots" within the apparatus will cause scorching or burning of the product resulting in an unacceptable end product. Similarly, if the discrete particles of the product are permitted to stick together or to stick to the walls of the container, non-uniformity of cooking will result. Consequently, various types of agitation mechanisms have been suggested to ensure uniform cooking and to prevent the particles of the product from sticking together. Frequently, however, such mechanisms are inefficient, costly, and difficult to maintain.

As will become apparent from the description which follows, the present invention provides a new and novel approach to large-scale food product preparation which totally eliminates the need for mechanical agitation. Additionally, because of the unique design of the cooking apparatus, uniformity of temperature is ensured throughout the cooking vessel so that each particle of the product is evenly cooked.

SUMMARY

It is an object of the present invention to provide a method and apparatus for cooking a food product such as corn in which large quantities of the food product can be cooked automatically at a uniform, precisely controlled temperature.

It is another object of the invention to provide a method and apparatus of the aforementioned character in which, during cooking, each discrete particle of the food product is completely surrounded by heated water so that the food particles will not stick together and each particle will be uniformly cooked.

More specifically, it is an object of the present invention to provide a simple, highly reliable and inexpensive method and apparatus for cooking large quantities of corn in the form of discrete kernels which are immersed in water to form a homogeneous mass and in which live steam is used to controllably and uniformly heat the mass.

It is another object of the invention to provide a method and apparatus as described in the preceding paragraph in which the individual kernels of corn are gently agitated during cooking by continuously circulating the heated water throughout the homogeneous mass.

It is still another object of the invention to provide a method and apparatus of the class described in which, subsequent to the cooking step, the food product can be steeped in the cooking vessel for the desired length of time without transferring it to another container.

It is another object of the invention to provide a method and apparatus as described in the previous paragraph in which, following cooking and steeping, the food product can expeditiously be removed from the apparatus and separated from the water for further processing.

It is yet another object of the invention to provide a unique food cooking apparatus which embodies a minimum number of moving parts, is highly reliable, can be inexpensively produced, can readily be installed, and can easily be used.

DESCRIPTION OF ONE FORM OF THE INVENTION

Figure 1:
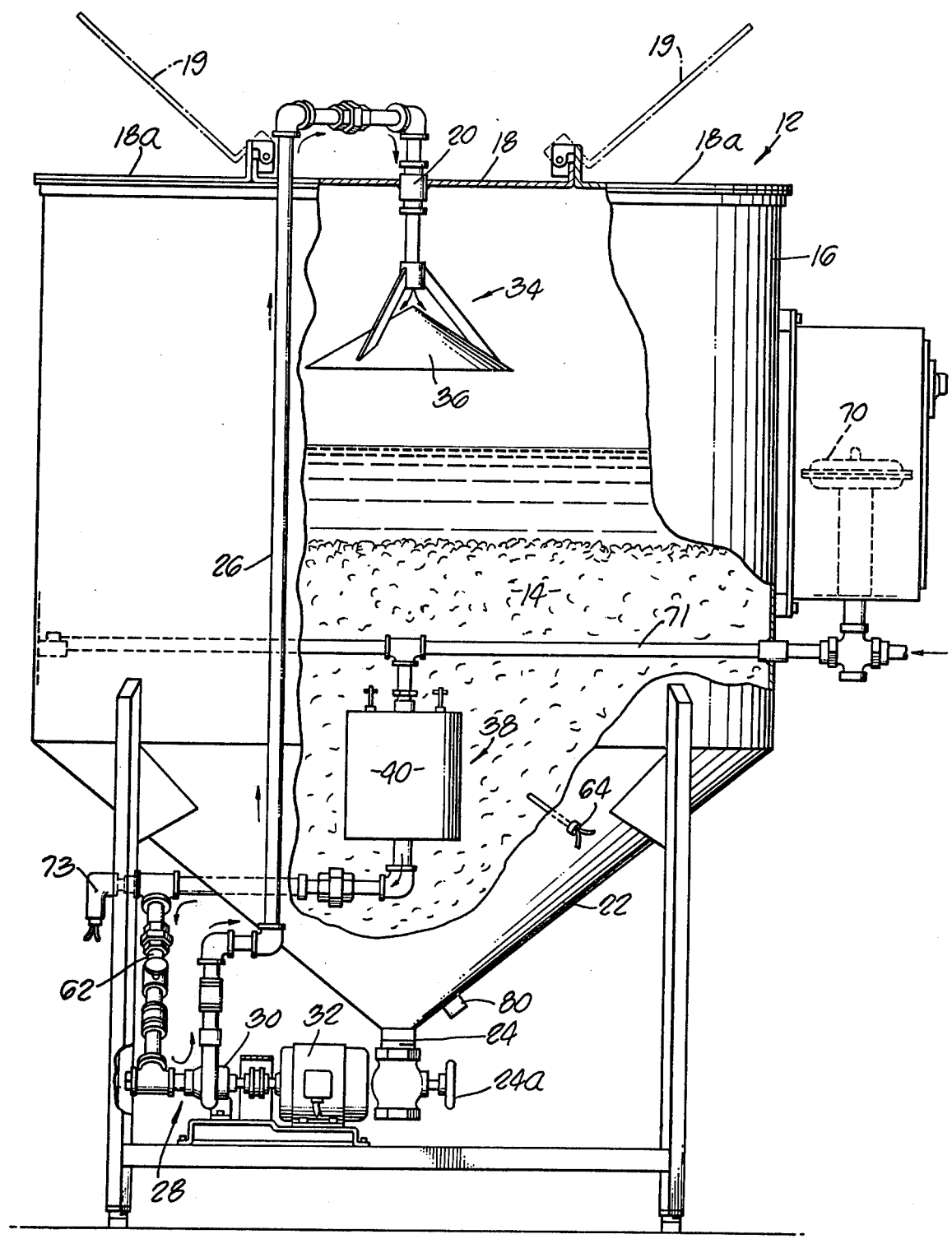
FIG. 1 is a side elevational view of the cooking apparatus of the present invention partly broken away to show internal construction.

Referring to the drawings and particularly to FIG. 1, the cooking apparatus of the present invention comprises a vessel 12 for containing a homogeneous mass made up of the food product to be cooked, generally designated by the numeral 14, immersed in water or a mixture of water and appropriate additives to facilitate the cooking operations. For example, when the product to be cooked is corn in kernel form, it has been found desirable to add small amounts of lime to the water to break the outer husk of the kernels of corn so as to more uniformly cook the interior of the kernels. When cooking other types of food products, other additives, such as salt, soda, or the like, may serve to enhance the cooking operation. The cooking vessel in this embodiment of the invention comprises a generally cylindrically shaped upper portion 16 having a top wall 18 provided with a centrally disposed inlet means 20 for receiving a water mixture from a pump or other source and introducing it interiorly of the vessel. Interconnected with upper portion 16 is a frustoconically shaped lower portion 22 having an outlet port 24 at the lower extremity thereof for removing the food product from the vessel. In practice, the top and bottom portions of the vessel may be separately constructed of a suitable material such as sheet metal and are joined together by any suitable means such as by welding. Inlet means 20 is interconnected by a conduit such as piping 26 with the outlet of a pump means designated by the numeral 28. As will subsequently be discussed, pump means 28 circulates the liquid within the apparatus and more particularly, throughout the homogeneous mass comprising the food product to be cooked, which is immersed in the water mixture. Pump means 28 is of a conventional design, including a centrifugal pump 30 driven by an electric motor 32.

Provided interiorly of vessel 12 is a deflector means identified generally by the numeral 34. In the form of the invention shown in the drawings, deflector means 34 comprises a frustoconically shaped member 36 located adjacent water inlet means 20. As best seen in FIG. 1, member 36 is positioned within the vessel so that water entering the vessel will impinge upon the apex thereof and will be uniformly deflected radially outwardly within the vessel. As will later become apparent, deflection of the water in this manner contributes to the uniform heating of the homogeneous mass.

Figure 2:
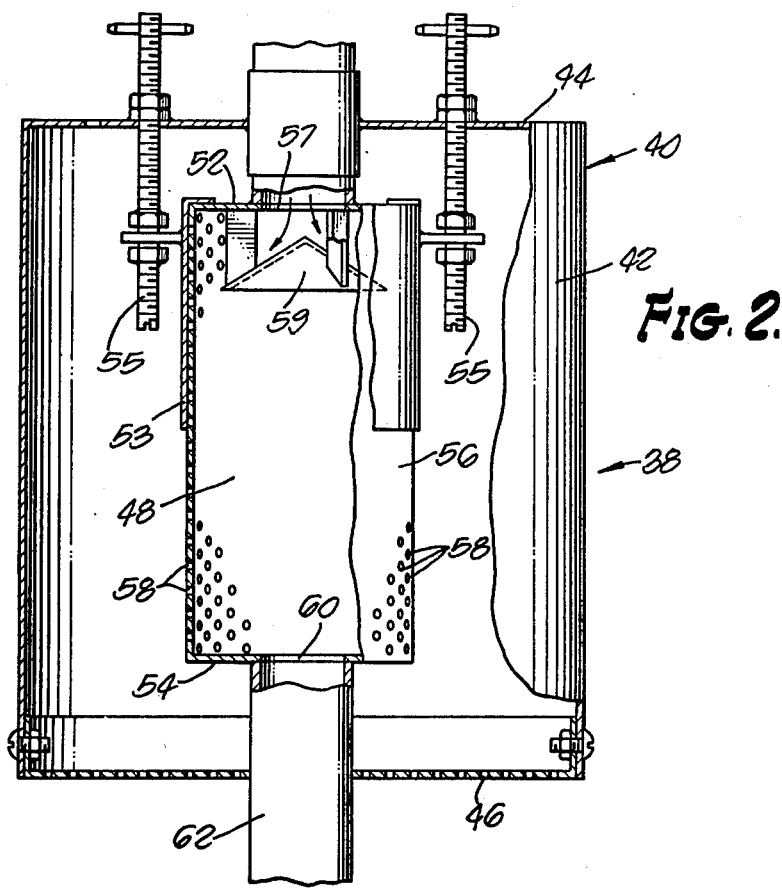
FIG. 2 is a side elevational view of the steam injector means of the invention shown partly in section.

Disposed within the lower portion of vessel 12 and intermediate of the homogeneous mass is a steam injector means 38 for injecting live steam into the vessel. The steam injector means performs the important function of uniformly and controllably heating the product being cooked. Referring to FIG. 2, the steam injector means of this form of the invention can be seen to comprise a generally cylindrically shaped outer housing 40 having side walls 42, a perforated top wall 44, and a perforated bottom wall 46. Also forming a part of the steam injector means is a steam chamber 48 mounted within housing 40. Steam chamber 48 has a top wall 52, a bottom wall 54, side walls 56, and a steam inlet 57 formed in top wall 52. Side walls 56 are provided with a plurality of steam outlet passages 58 arranged to eject steam outwardly in a direction toward side walls 42 of housing 40. Also forming an important part of the steam injector means is a steam deflector means mounted within chamber 48 adjacent to steam inlet 50 for deflecting the steam entering the chamber radially outwardly toward passageways 58. In the present form of the invention, this deflector means comprises a frustoconically shaped member 59 mounted in the manner illustrated in FIG. 2. With this construction, the steam entering chamber 48 will strike the apex of the member and will be uniformly deflected radially outwardly toward side walls 56. Means in the form of cylindrical cover 53 adjustably carried by threaded rods 55 is provided for removably covering a portion of the outlet passageways 58 to control the flow path of steam into housing 40. Referring also to FIG. 2, it can be seen that wall 54 of the steam chamber is provided with an outlet passageway 60 which is interconnected with the inlet side of pump 30 by means of a conduit 62.

Figure 3:
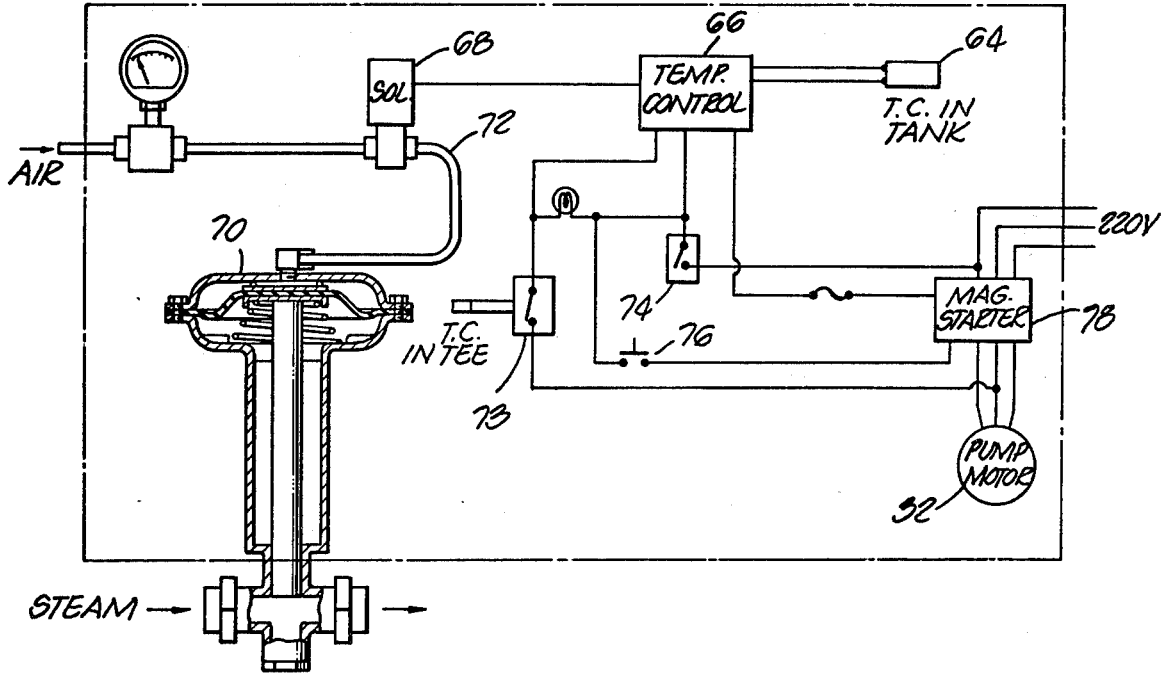
FIG. 3 is a schematic illustration of the control system of the invention for controlling circulation of water within the apparatus and for regulating the flow of steam to the steam injector means.

Cooperatively associated with the steam injector means 38 are sensor and control means for sensing the temperature of the homogeneous mass and stopping the flow of steam into the steam chamber when a predetermined temperature is reached. Referring to FIGS. 1 and 3, the sensor means can be seen to comprise a thermocouple element 64 carried by portion 22 of tank 12 and extending into the homogeneous mass contained within the vessel. As illustrated in FIG. 3, thermocouple element 64 is operatively associated with a temperature control element 66 which, in turn, is interconnected with a solenoid 68. Operatively associated with solenoid 68 is a fluid actuated valve 70 which is adapted to control the flow of steam from an exterior source of steam (as indicated by the arrows at the center right and lower left of FIGS. 1 and 3 respectively) into vessel 12 and through conduit 71 to steam injector means 38. Valve 70 is appropriately interconnected by conduit 72 with a source of fluid under pressure, such as air. As shown in FIG. 3, solenoid 68 is located intermediate the source of fluid and valve 70 and controls the flow of fluid through conduit 72. Thermocouple 64, as well as temperature control 66, solenoid 68, and valve 70, are all of standard design and are commercially available. In operation, when thermocouple 64 senses that the desired temperature of the homogeneous mass has been reached, temperature control 66 opens the circuit to solenoid 68, de-energizing it, causing valve 70 to be activated to stop the flow of steam toward steam injector means 38. As a safety measure, a thermocouple 73 (FIG. 1) is placed in a tee located in conduit 62. As illustrated in FIG. 3, this thermocouple is operatively interconnected within the control circuit so that should the temperature of the water in the outlet conduit 62 exceed safe limits, solenoid 68 will be de-energized, closing valve 70 and stopping the flow of steam to the vessel. Although the interconnection of these various elements, to accomplish the purpose stated, is illustrated only in schematic form in the drawings, in practice the physical connection of the elements can readily be accomplished by one skilled in the art.

OPERATION

In practicing the method of the present invention, vessel 12 is first partially filled with water to which suitable additives such as lime has been introduced. The product to be cooked, as for example corn in kernel form, is then introduced into vessel 12 through openings in the top of the vessel generally designated as 18a (FIG. 1). Pivotally mounted doors 19 adapted to close openings 18a are then lowered into their closed position. Cooking operations are begun by setting timer 74 (FIG. 3) to the desired time interval and closing switch 76. Closing of switch 76 energizes magnetic starter 78 which, in turn, energizes pump motor 32, causing circulation of the water mixture throughout the apparatus in a manner presently to be described. Closing of switch 76 also results in commencement of the flow of live steam from the external steam generator into steam injector means 38 of the apparatus.

As best seen in FIG. 1, during the cooking operation housing 40 is at all times filled with liquid which enters the housing through the perforated top and bottom walls thereof. The apertures in the top and bottom walls of housing 40, however, are of such a size as to preclude admission of the particles of the food product being cooked into the interior of housing 40. Turning to FIG. 2, it will be observed that when live steam is flowing into the steam injector means through inlet 57, it will impinge upon deflector member 59 and will be diverted uniformly outwardly through passageways 58 into the liquid located interiorly of housing 40. This flow pattern of live steam functions to efficiently and uniformly heat the liquid contained within housing 40.

As long as pump 30 is operating, the heated liquid is continuously being drawn from housing 40 into the steam chamber 48 through its perforated side walls toward conduit 62. Due to the suction of the pump, the heated liquid will then flow through conduit 62 into pump 30 and will be forced upwardly through conduit 26 to the top of vessel 12 where it is reintroduced into the vessel through inlet 20. As previously mentioned, the liquid entering the vessel will impinge upon deflector member 36 and will be deflected radially outwardly into the tank. The heated liquid will then flow through the product being cooked, resulting in uniform heating of each particle of the food product. When the liquid once more reaches housing 40, it will again be heated by the live steam flowing through injector means 38. This continuous circulation of the heated water through the homogeneous mass causes the temperature thereof to rise very uniformly, and also causes a gentle agitation of the discrete particles of the food product. It is this gentle agitation which prevents the particles of the product from sticking together or from sticking to the side walls of the vessel.

Introduction of live steam into the steam injector means is continued until the temperature of the homogeneous mass is raised to the desired temperature. When this temperature is reached, thermocouple 64, in cooperation with temperature control 66, will de-energize solenoid 68 causing valve 70 to close precluding further flow of steam into the apparatus. The liquid in the vessel, however, will continue to be circulated by pump 30 until timer 74 reaches the end of the pre-set interval. At this time, the circuit to the magnetic starter will be opened, de-energizing pump motor 32.

It is to be appreciated that the temperature to which the homogeneous mass is raised and the time interval during which the liquid is circulated varies, depending upon the type of product being cooked. By way of example, for cooking corn in kernel form, it has been determined that the temperature to which the homogeneous mass should be raised is between approximately 170° F. and approximately 180° F. and the time interval in which the water is circulated is on the order of two hours after the flow of steam to the vessel has been stopped. Adherence to these operating parameters has been found to produce a superior end product ideally suited for subsequent milling or grinding operations. After circulation of the liquid has ceased, if desired the product may be left in the cooking vessel to steep. When the product to be cooked is corn, the optimum steeping time has been determined to be on the order of ten hours. Following the steeping step, outlet 24 is opened by opening valve 24a thereby permitting removal of the cooked food product. Depending upon the product being prepared, removal through outlet 24 may be by force of gravity, or the material may be removed by any suitable pumping means and transferred to storage containers or to auxiliary apparatus for further processing. To facilitate removal of the food product through outlet 24, air under pressure may be introduced into the lower portion of vessel 12 by means of an air inlet port 80 (FIG. 1). This introduction of air under pressure will loosen the food product, permitting it to more easily pass through outlet port 24.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:
1. A method of cooking discrete particles of corn comprising the steps of:
(a) providing a cooking vessel having an upper, lower and intermediate region;
(b) immersing the corn particles to be cooked in water contained in said vessel to form a homogeneous mass in which each corn particle is surrounded by water;
(c) introducing water at the upper region of said cooking vessel and deflecting said water radially outwardly therewithin, circulating the water throughout the homogeneous mass and removing water from the lower region of said cooking vessel;
(d) providing within the intermediate region of said cooking vessel a steam chamber having a steam inlet and perforated side walls, said side walls being adapted to maintain the corn particles in a spaced relationship with said steam inlet;
(e) introducing live steam into said steam chamber through said steam inlet and directing said steam into the homogeneous mass by deflecting said steam radially outwardly through said perforated side walls of said steam chamber to uniformly raise the temperature of said homogeneous mass and gently agitate the particles of corn;
(f) stopping the flow of live steam into the homogeneous mass when the temperature of the water within said cooking vessel is raised to between approximately 170° F. and approximately 180° F.;
(g) stopping the circulation of water; and then
(h) separating the particles of corn from the water and removing said particles from the vessel proximate the lower region thereof.

2. The method as defined in claim 1 in which the water is circulated for on the order of two hours after the flow of steam is stopped.

3. A method of cooking discrete particles of corn comprising the steps of:
(a) providing a cooking vessel having an upper, lower and intermediate region;
(b) immersing the corn particles to be cooked in water contained in said vessel to form a homogeneous mass in which each corn particle is surrounded by water;
(c) introducing water at the upper region of said cooking vessel and deflecting said water radially outwardly therewithin;
(d) circulating the water throughout the vessel by continuously removing it from the lower region of said cooking vessel and reintroducing it at the upper region thereof;
(e) providing within the intermediate region of said cooking vessel a steam chamber having a steam inlet and perforated side walls, said side walls being adapted to maintain the corn particles in a spaced relationship with said steam inlet;
(f) introducing live steam into said steam chamber through said steam inlet and directing said steam into the homogeneous mass by deflecting said steam radially outwardly through said perforated side walls of said steam chamber to uniformly raise the temperature of said homogeneous mass and gently agitate the corn particles;
(g) stopping the flow of live steam into the homogeneous mass when the temperature of the water within said cooking vessel is raised to between approximately 170° F. and approximately 180° F.;
(h) after approximately two hours stopping the circulation of water; and then
(i) separating the corn particles from the water and removing said particles from the vessel proximate the lower region thereof.

* * * * *